(12) United States Patent
Coughran et al.

(10) Patent No.: US 8,756,039 B2
(45) Date of Patent: Jun. 17, 2014

(54) RAPID PROCESS MODEL IDENTIFICATION AND GENERATION

(75) Inventors: Mark Coughran, Austin, TX (US); Gregory K. McMillan, Austin, TX (US)

(73) Assignee: Fisher-Rosemount Systems, Inc., Round Rock, TX (US)

(*) Notice: Subject to any disclaimer, the term of this patent is extended or adjusted under 35 U.S.C. 154(b) by 155 days.

(21) Appl. No.: 12/960,432

(22) Filed: Dec. 3, 2010

(65) Prior Publication Data

US 2011/0218782 A1   Sep. 8, 2011

Related U.S. Application Data

(60) Provisional application No. 61/309,737, filed on Mar. 2, 2010.

(51) Int. Cl.
*G06F 7/60* (2006.01)
*G06F 17/10* (2006.01)
*G06G 7/48* (2006.01)

(52) U.S. Cl.
USPC .................................................. 703/2; 703/6

(58) Field of Classification Search
USPC ................... 703/2, 6, 12–13; 700/29–32, 42
See application file for complete search history.

(56) References Cited

U.S. PATENT DOCUMENTS

| | | | |
|---|---|---|---|
| 4,959,767 A | 9/1990 | Buchner et al. | |
| 5,521,095 A | 5/1996 | Wojciechowski et al. | |
| 5,568,377 A | 10/1996 | Seem et al. | |
| 6,466,893 B1 | 10/2002 | Latwesen et al. | |
| 6,577,908 B1 | 6/2003 | Wojsznis et al. | |
| 6,745,088 B2* | 6/2004 | Gagne | 700/29 |
| 6,751,579 B1 | 6/2004 | Misheloff et al. | |
| 6,870,345 B1* | 3/2005 | Wand | 318/610 |
| 7,006,900 B2* | 2/2006 | Zhenduo et al. | 700/299 |
| 7,050,880 B2 | 5/2006 | de Roover et al. | |
| 7,113,834 B2 | 9/2006 | Wojsznis et al. | |
| 7,209,793 B2* | 4/2007 | Harmse et al. | 700/29 |
| 7,242,989 B2 | 7/2007 | Blevins et al. | |

(Continued)

FOREIGN PATENT DOCUMENTS

| | | |
|---|---|---|
| GB | 2 394 312 A | 4/2004 |
| GB | 2 409 293 A | 6/2005 |

OTHER PUBLICATIONS

Search Report for Application No. GB1103055.8, dated Jun. 27, 2011.

*Primary Examiner* — Aniss Chad
(74) *Attorney, Agent, or Firm* — Marshall, Gerstein & Borun LLP

(57) ABSTRACT

A rapid process model identification technique identifies, in a relatively short period of time, the dynamic relationship between a process input and a process output by developing an estimate of an integrating gain and a process deadtime from the initial response of the process output to a change in the process input. The integrating gain and deadtime values are then used to generate a complete process model for any of many different types of processes. These process models can be used very quickly to perform process simulation or can be used for control purposes, so as to be able to bring a process control system that uses or relies on process models on line much more quickly than was possible in the past. Moreover, this rapid modeling technique can be used to develop simulation models before the controller has completed responding to even a single process upset.

57 Claims, 6 Drawing Sheets

(56) References Cited

U.S. PATENT DOCUMENTS

| | | |
|---|---|---|
| 7,305,297 B2 | 12/2007 | Yasui et al. |
| 7,653,445 B2 | 1/2010 | Chia et al. |
| 7,877,154 B2 * | 1/2011 | Blevins et al. .................. 700/31 |
| 2005/0071038 A1 | 3/2005 | Strang |
| 2005/0187643 A1 | 8/2005 | Sayyar-Rodsari et al. |

* cited by examiner

RAPID PROCESS MODEL IDENTIFICATION AND GENERATION

RELATED APPLICATIONS

This application is a regularly filed application from, and claims priority to and the benefit of the filing date of U.S. Provisional Patent Application No. 61/309,737, entitled "Rapid Process Model Identification and Generation," which was filed on Mar. 2, 2010, the entire disclosure of which is hereby expressly incorporated by reference herein.

TECHNICAL FIELD

The present invention relates generally to process control systems and, more particularly, to a method for rapidly identifying and generating process models for use in control and simulation activities in process control systems, such as industrial process plants.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital busses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, and uses this information to implement a control routine which then generates control signals that are sent over the busses to the field devices to control the operation of the process. Information from field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Emerson Process Management, use function blocks or groups of function blocks referred to as modules located in the controller or in different field devices to perform control operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, controlling a device, or performing a control operation, such as the implementation of a proportional-derivative-integral (PID) control routine. The different function blocks and modules within a process control system are generally configured to communicate with each other (e.g., over a bus) to form one or more process control loops.

Process controllers are typically programmed to execute a different algorithm, sub-routine or control loop for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and an output block, such as an analog output (AO) function block.

Control routines, and the function blocks that implement such routines, have been configured in accordance with a number of control techniques, including PID control, fuzzy logic control, and model-based techniques such as a Smith Predictor or Model Predictive Control (MPC). In model-based control techniques, the parameters used in the routines to determine the closed loop control response are based on the dynamic process response to changes in the manipulated or measured disturbances serving as inputs to the process. A representation of this response of the process to changes in process inputs may be characterized as a process model. For instance, a first-order parameterized process model may specify values for the gain, deadtime, and dominant time constant of the process.

MPC, which is one particular type of model-based control technique, involves using a number of step or impulse response models designed to capture the dynamic relationships between process inputs and outputs. With MPC techniques, the process model is directly used to generate the controller. When used in connection with processes that experience large changes in process deadtime, process delay, etc., the MPC controller must be automatically regenerated using the models to match the current process condition. In such cases, a process model is accordingly identified at each of a number of operating conditions. However, the introduction of multiple process models and the requisite automatic generation of the controller to matching the current process condition undesirably increases the complexity of the process control system.

Process models have also been used to set tuning parameters of PID and other control schemes using adaptive control techniques, wherein the tuning of the PID (or other) controller is generally updated as a result of changes in the process model and a user-selected tuning rule. For example, U.S. Pat. No. 7,113,834, entitled "State Based Adaptive Feedback Feedforward PID Controller" and U.S. Pat. No. 6,577,908 entitled "Adaptive Feedback/Feedforward PID Controller" disclose the use of process models to perform adaptive control.

Despite the promise of improved control performance, the use of model based control and adaptive control techniques in the process industry has been limited, insofar as the techniques have often been difficult to implement in practice. As a practical matter, model identification has typically been part of a special function block designed specifically for MPC control or adaptive control. Unfortunately, it is often difficult to determine which process control loops would benefit from the implementation of adaptive control, i.e., which loops should be selected for adaptive control capability. One reason involves the sheer number (e.g., hundreds) of control loops and instruments (e.g., thousands) that are monitored in a typical plant. Regardless of the size or complexity of the plant, conventional process control systems typically do not support the creation of process models for all of the control loops in the plant. Making matters worse, significant testing is necessary to identify new process models for each control loop for which a model is to be determined. For instance, such testing may require the application of one or more process perturbations that are incompatible with the operation of an on-line process.

As noted above, developing process models for use in control systems can be a manually involved process, and even if it is automated, may take a significant amount of time to perform. Generally, to develop a process model for a control loop, a process upset or a control signal is changed, and the responses of the process variables being controlled are monitored to determine process response time, process gain, process deadtime, etc. for the process loop. This technique may be used to determine the dynamics of fast processes or fast process loops, such as flow and liquid pressure control loops, rapidly and easily because the time it takes for a process variable to reach its resting value for these loops occurs in matter of seconds, thereby enabling the quick identification of the process dynamics using any of a wide variety of techniques. However, for slow processes or process loops, such as vessel or column level, temperature, pH, and composition control loops, the relevant process variable may take minutes, hours, and even days to reach a set point or a final resting value. Moreover, disturbances often occur before the test is complete, making further testing necessary. As a result, present model identification tools for these processes typically require multiple tests, even for relatively quiet processes. Consequently, it may take days to weeks to identify a complete or an accurate set of models for slow process loops.

Also, for continuous processes, set point changes may be relatively infrequent and are generally only made in normal course during process startup, or during rate changes or grade transitions. Moreover, for batch processes, there are normally only one or two set point changes in a batch variable, such as temperature. As a result, it is difficult to perform the multiple tests necessary to develop a model for these loops. Additionally, for the reasons discussed above, most of existing process model identification tools are associated with model predictive control and adaptive proportional, integral, derivative (PID) controllers or PID auto-tuners, and are not generally used with control loops for slow processes.

SUMMARY

A rapid process model identification technique identifies, in a relatively short period of time, such as within minutes, the dynamic relationship between any process input and process output, even for slow processes or process loops. This model identification technique can then be used to generate process models for many different types of processes and can be used for control purposes, so as to be able to bring a process control system that uses or relies on process models on line much more quickly than possible in the past. Moreover, this technique can be used to develop a simulation system for a process loop before the controller that controls the process loop has completed responding to even a single process upset or set point change. This feature allows the quickly generated model to be used to control the process in response to the process upset that was used to generate the model in the first place, e.g., before the end of the process response time period for the process or before a process controller has controlled the process to reach steady state in response to the process upset (which may be caused by a change in a manipulated variable within the process). In any event, this process model identification technique can be used to quickly determine initial process models that can be used immediately to perform process control and simulation for the process, and which can be updated, modified or refined as more data about the process loops becomes available over time.

In one case, a method of generating a process model for a process includes collecting process data related to a process variable and a manipulated variable within the process and determining a ramp rate associated with the process variable after a change in the manipulated variable from the collected process data that is generated within a particular time period. Here, the particular time period is shorter than the process response time associated with the process and is at least partially after the end of a deadtime period associated with the process. The method then generates a process model for the process using the determined ramp rate. The method may further include estimating a process deadtime associated with the process from the collected process data, and may use the estimated process deadtime in addition to the ramp rate to generate process model. The method may determine the ramp rate associated with the process variable by determining a change in the process variable over the particular time period, wherein the length of the particular time period is related to an estimated process deadtime for the process. The length of the particular time period may be, for example, equal to the estimated process deadtime or may be a multiple of the estimated process deadtime.

In some cases, the particular time period occurs (at least partially) within a time frame that starts at the end of the deadtime period and that extends a length of time, for example, equal to or less than ten times the process deadtime after the end of the deadtime period. More generally, the particular time period occurs shortly or immediately after the end of the process deadtime period of the process (after a change in the manipulated variable). In some cases, the particular time period may be in a time period expanding the length of one or a few deadtimes of the process after the end of the process deadtime period, may be within the first half of the process response time of the process, or for deadtime dominate processes, may be within a time period greater than this. However, the particular time period is always less than the process response time for the process associated with a change in the manipulated variable.

Generating a process model for the process may include determining an integrating gain for the process from the determined ramp rate by determining a ratio of the determined ramp rate to the change in the manipulated variable. Moreover, the method may use the integrating gain determined for the process to determine other process model parameters for the process and may use the process model parameters to simulate the operation of the process prior to the end of the process response time. The method may also or alternatively use the process model parameters to determine control parameters for controlling the process and may use the control parameters to control the process prior to the end of the process response time.

Still further, the method may determine the ramp rate associated with the process variable after a change in the manipulated variable by determining multiple values of a process variable ramp rate over different time periods of equal length (such as a time equal to the length of the estimated process deadtime) and may determine the ramp rate as a statistical measure of the multiple values of the process variable ramp rate. For example, the method may determine the ramp rate as a maximum, an average, a median, etc. of the multiple values of the process variable ramp rate.

In another case, a method of simulating the operation of a process includes collecting process data related to a process variable and a manipulated variable within the process, determining a ramp rate associated with the process variable after a change in the manipulated variable from the collected process data and generating a process model for the process using the determined ramp rate. The method then simulates the operation of the process using the process model prior to the process being controlled to reach steady state in response to the change in the manipulated variable. The method may further include using the simulation to determine a new set of control parameters for a process controller that controls the process prior to the process being controlled to reach steady state in response to the change in the manipulated variable. Still further, the method may provide the new set of control parameters to the process controller that controls the process prior to the process being controlled to reach steady state in response to the change in the manipulated variable and may use the new set of control parameters in the process controller to control the process to reach steady state in response to the change in the manipulated variable.

This method may further include estimating the process deadtime associated with the process from the collected process data, and may use the determined process deadtime and the determined ramp rate to generate the process model.

In another case, a method of controlling a process being controlled by a process controller using a set of control parameters includes collecting process data related to a process variable and a manipulated variable within the process, determining a ramp rate associated with the process variable after a change in the manipulated variable from the collected process data before the process is controlled to reach steady state in response to the change in the manipulated variable and generating a process model for the process using the determined ramp rate. This method may use the process model to determine a new set of control parameters for the process controller prior to the process being controlled to reach steady state in response to the change in the manipulated variable and may provide the new set of control parameters to the process controller prior to the process being controlled to reach steady state in response to the change in the manipulated variable.

In still another case, a process model generation system includes a processor, a first routine stored on a computer readable medium that operates on the processor to collect process data related to a process variable and a manipulated variable within an on-line process, a second routine stored on the computer readable medium that operates on the processor to determine a ramp rate associated with the process variable after a change in the manipulated variable over a time period that is shorter than the process response time associated with the process and a third routine stored on the computer readable medium that generates a process model for the process using the determined ramp rate. A fourth routine stored on the computer readable memory may operate on the processor to estimate the process deadtime associated with the process from the collected process data, and the second routine may use the estimated process deadtime to determine the ramp rate. In addition, the third routine may generate the process model for the process using the determined ramp rate by determining an integrating gain for the process from the determined ramp rate. If desired, the second routine may determine the ramp rate associated with the process variable after a change in the manipulated variable by determining multiple values of a process variable ramp rate over different time periods of equal length and may determine the ramp rate as a statistical measure of the multiple values of the process variable ramp rate.

Still further, a process modeling system for use with a process includes a data collection unit that collects process data related to a process variable and a manipulated variable within the process, a deadtime unit that determines, from the collected process data, a deadtime associated with the process, and a ramp unit that determines a ramp rate associated with the process variable after a change in the manipulated variable from the collected process data generated within a particular time period related to the determined deadtime, wherein the particular time period is shorter than the process response time associated with the process. Moreover, the process modeling system includes a modeling unit that generates a process model for the process using the determined ramp rate. If desired, the particular time period may be equal to the determined deadtime or may be a multiple of the determined deadtime.

Here, the ramp unit may include a delay block that delays the collected process variable by the particular time, a summer that determines a difference signal indicative of the difference between the current process variable value and the process variable value delayed by the delay unit and a divider unit that divides the difference signal by the particular time to produce the process variable ramp rate. The ramp unit may further determine a series of process variable ramp rates after a change in the manipulated variable, and may include a statistical block that determines a statistical measure of the series of process variable ramp rates to produce the process variable ramp rate. The statistical block may determine, for example, a maximum of the series of process variable ramp rates as the process variable ramp rate.

The process modeling system may also include a tuning unit that determines one or more control parameters from the process model for use in controlling the process and may include a controller that controls the process, such that the tuning unit provides the control parameters to the controller prior to the time that the controller controls the process to reach steady state in response to the change in the manipulated variable. The process modeling system may also or instead include a simulation unit that uses the process model parameters to simulate the operation of the process prior to the end of the process response time.

BRIEF DESCRIPTION OF THE DRAWINGS

For a more complete understanding of the disclosure, reference should be made to the following detailed description and accompanying drawing figures, in which like reference numerals identify like elements in the figures, and in which.

DETAILED DESCRIPTION

Figure 1:
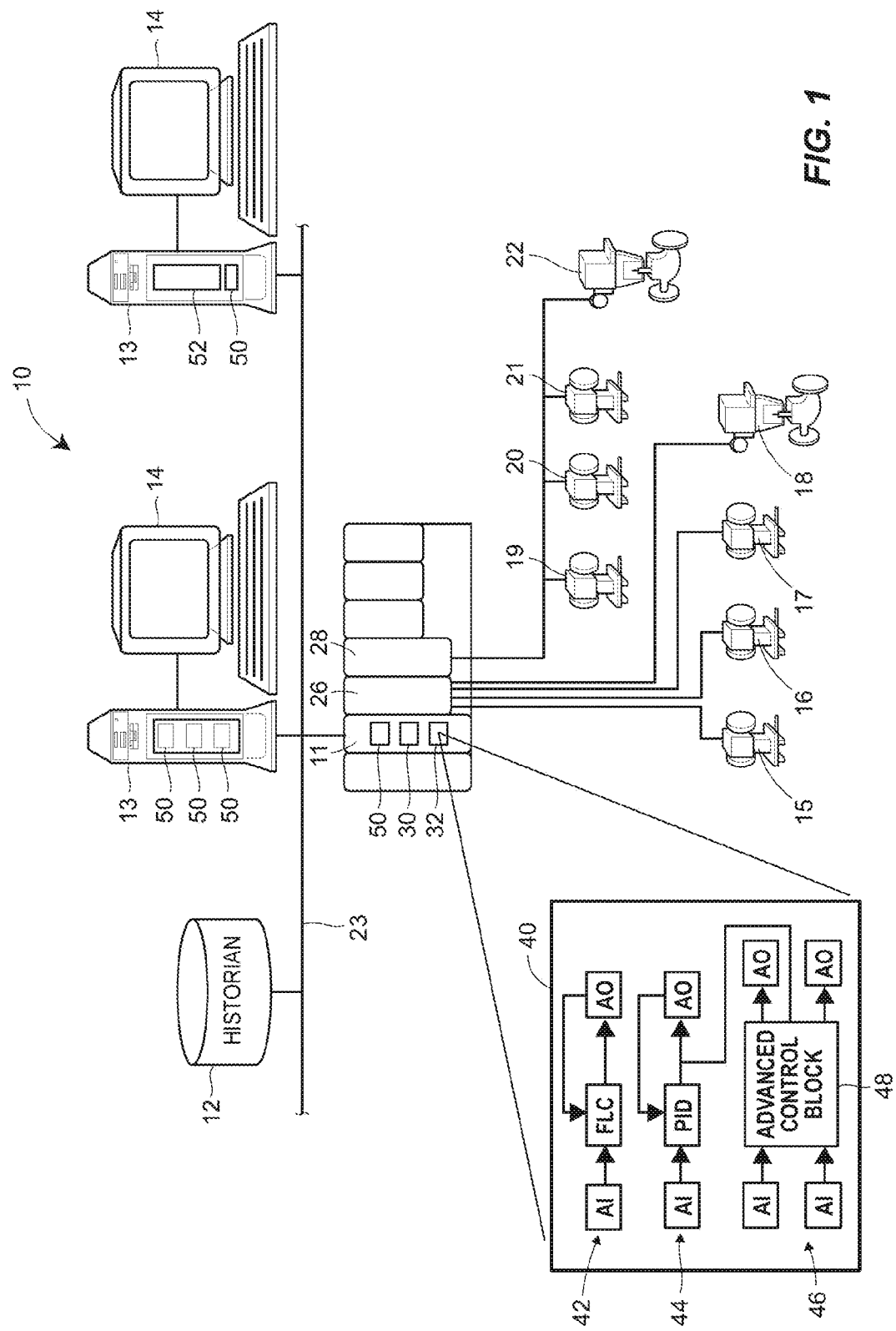
FIG. 1 is a schematic representation of a process control system including a controller configured with one or more control routines and including one or more rapid process model identification and generation modules communicatively coupled to a simulation system.

Referring now to FIG. 1, a process control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or Firmware for storing data. The data historian 12 may be separate from (as illustrated in FIG. 1) or a part of one of the workstations 13. The controller 11, which may be, by way of example, the DeltaV® controller sold by Emerson Process Management, is communicatively connected to the host computers 13 and to the data historian 12 via, for example, an ethernet connection or any other desired communication network 23. The controller 11 is also communicatively connected to the field devices 15-22 using any desired hardware and software associated with, for example, standard 4-20 ma devices and/or any smart communication protocol such as the FOUNDATION® Fieldbus protocol, the HART® protocol, the WirelessHART™ protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices or HART devices that communicate over analog lines or combined analog and digital lines to the I/O card 26, while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including ally standards or protocols developed in the future.

The controller 11 includes a processor 30 that implements or oversees one or more process control routines (stored in a memory 32), which may include control loops, and communicates with the devices 15-22, the host computers 13 and the data historian 12 to control a process in any desired manner. It should be noted that any control routines or modules described herein may have parts thereof implemented or executed by different controllers or other devices if so desired. Likewise, the control routines or modules described herein which are to be implemented within the process control system 10 may take any form, including software, firmware, hardware, etc. Of course, a process control module may be any part or portion of a process control system including, for example, a routine, a block or any element thereof, or any other software stored on any computer readable medium to be executed on a processor. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart Field devices such as HART devices, or may be stored in and implemented by the field devices themselves, which can be the case with Fieldbus devices. While the description of the control system 10 is provided herein using a function block control strategy, the disclosed techniques and system may also be implemented or designed using other conventions, such as ladder logic, sequential function charts, etc. or using any other desired programming language or paradigm.

As illustrated by the exploded block 40 of FIG. 1, the controller 11 may include a number of single-loop control routines, illustrated as routines 42 and 44, and, if desired, may implement one or more advanced control loops, such as multiple/input-multiple/output control routines, illustrated as control loop 46. Each such loop is typically referred to as a control module. The single-loop control routines 42 and 44 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 46 is illustrated as including inputs communicatively connected to one or more AI function blocks and outputs communicatively connected to one or more AO function blocks, although the inputs and outputs of an advanced control block 48 may be connected to any other desired function blocks or control elements to receive other types of inputs and to provide other types of control outputs. The advanced control block 48 may be any type of model predictive control (MPC) block, neural network modeling or control block, a multi-variable fuzzy logic control block, a real-time-optimizer block, etc. or may be an adaptively tuned control block, etc. It will be understood that the function blocks illustrated in FIG. 1, including the advanced control block 48, can be executed by the controller 11 or, alternatively, can be located in and executed by any other processing device, such as one of the workstations 13 or even one of the field devices 19-22.

Moreover, as illustrated in FIG. 1, one or more process model identification routines 50 may be stored in one or more devices of the process control system 10. While model identification routines 50 are illustrated as being stored in the controller 11 and the workstations 13, the routines 50 could be stored in and executed in other devices instead or as well, including, for example, in any of the field devices 15-22. Each model identification routine 50 is communicatively coupled to one or more control routines such as the control routines 42, 44, 46, to receive one or more manipulated variables (e.g., controller outputs) and one or more measured process variables. Each model identification routine 50 is responsible for rapidly identifying a process model for one or more process loops or processes based on a process upset or controller signal (including set point changes) and one or more measured process variables. While any particular model identification routine 50 may determine a process model for a particular related set of a manipulated variable (e.g., a controller output or a set point) and a process variable being controlled by the controller output, a model identification routine 50 may determine the relationship between or may determine a process model associated with any desired set of manipulated variables and process variables, and is not limited to determining process models for a set of manipulated variables and process variables associated with a particular control loop.

As illustrated in FIG. 1, a simulation system 52 is stored in and may be executed by one of the workstations 13. The simulation system 52 is communicatively coupled to one or more of the model identification routines 50 and uses one or more process models developed by the model identification routines 50 to perform simulation. In this case, the simulation system 52 may be communicatively coupled to any or all of the model identification routines 50 to receive process models from the routines 50 as the process models are being developed. A use may use the simulation system 52 to perform process simulation, to thereby simulate the future operation of the process based on the identified process models. As will be understood from the discussion provided below, because the model identification routines 50 are able to rapidly determine process models or process relationships based on feedback from the operating process, the simulation system 52 may be up and running and may be able to simulate a process or a process loop being controlled by the controller 11, prior to the controller 11 actually implementing a complete control response (in which the controller 11 controls the process variable in response to a process upset or a change in a process variable set point). This feature makes the simulation system 52 quickly useful after the set up of the process control system 10, or after a change in a process control system 10, and makes the simulation system 52 useful in tuning process control loops while the controller 11 is still controlling the process in response to a particular process upset, disturbance or set point change.

The operation of the model identification routines 50, which implement a method of rapidly determining a process model or a relationship between a manipulated variable (including a disturbance variable) and a process variable, will now be described in conjunction with FIGS. 2-6. Generally speaking, there are three basic types of processes defined by their open loop control responses, including an integrating process, a self-regulating process and a run-away process. In an integrating process, the process variable continually ramps at a fairly steady state in response to a step change in the manipulated variable. In a self-regulating process, the process variable will, in response to a step change in the manipulated variable, ramp towards a new steady state value, will decelerate as it approaches a new steady state value, and will eventually level off at the new steady state value. Self-regulating processes are generally described as negative feedback processes. On the other hand, in a run-away process, the process variable will, in response to a step change in the manipulated variable, ramp at an accelerating rate until the process variable hits a relief or an interlock setting in the control system, which halts the process in some manner. Run-away processes are generally described as positive feedback processes.

Figure 2:
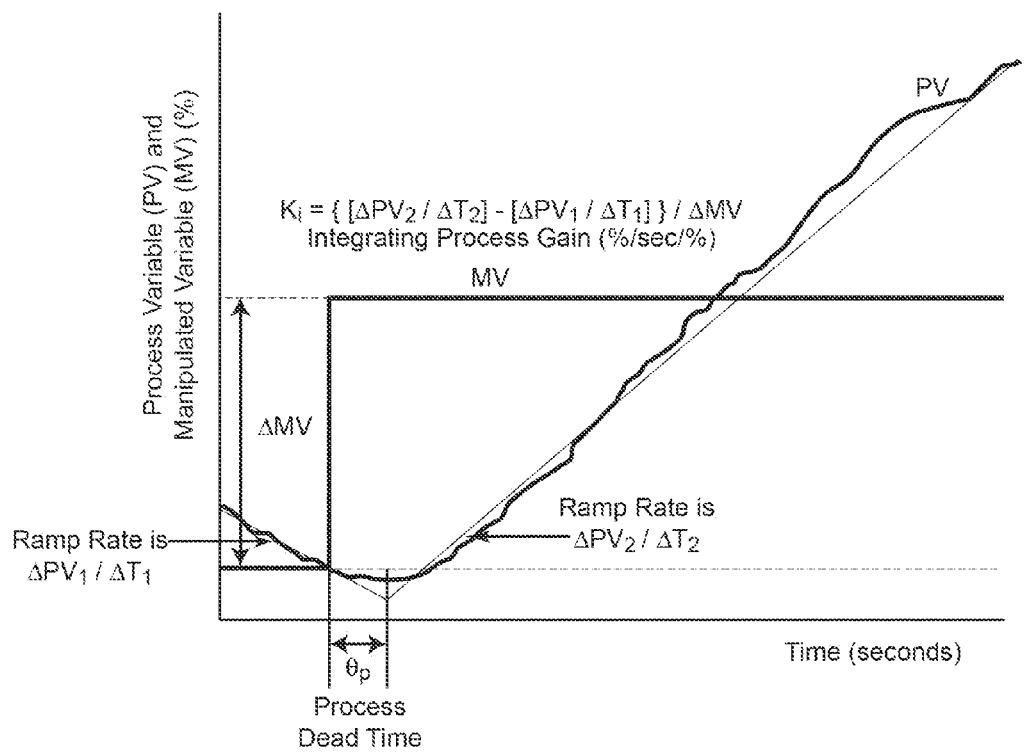
FIG. 2 is a graph depicting a typical response of a process variable to a change in a manipulated variable in an integrating process.

FIG. 2 illustrates the open loop control response of an example integrating process, which is typical in level processes and certain batch processes. As illustrated in FIG. 2, in response to a step change in the controller output (i.e., the manipulated variable), the ramp rate of the process variable PV changes, and continues to ramp at basically a constant ramp rate without ever lining out at a steady state value. Typically, the change in ramp rates from the time before the change in the manipulated variable MV until a significant period of time after the change in the manipulated variable MV is used to identify the integrating gain ($K_i$) from an open loop test. For closed loop control, the process variable PV will generally settle at a set point before and after the test. In this case, the initial process variable ramp rate is typically zero and the process variable ramp rate over the entire response period is used to identify the integrating gain $K_i$. In any event, the integrating gain $K_i$ of an integrating process can be calculated as the change in the ramp rate of the process variable before and after the change in the manipulated variable, and can be mathematically expressed as:

$$K_i = \{[\Delta PV_2/\Delta T_2] - [\Delta PV_1/\Delta T_1]\}/\Delta MV$$

where:

$\Delta MV$ is the change in the manipulated variable;

$\Delta PV_1$ is the change in the process variable over a period of time $\Delta T_1$ which occurs just prior to the change of the process variable initiated by a significant change in the manipulated variable; and $\Delta PV_2$ is the maximum change in the process variable over a period of time $\Delta T_2$ which occurs after the change in the process variable initiated by a significant change in the manipulated variable.

Generally, this calculation is performed using the changes in the process variable PV and the manipulated variable MV expressed as percentage changes in the ranges of these variables.

Figure 3:
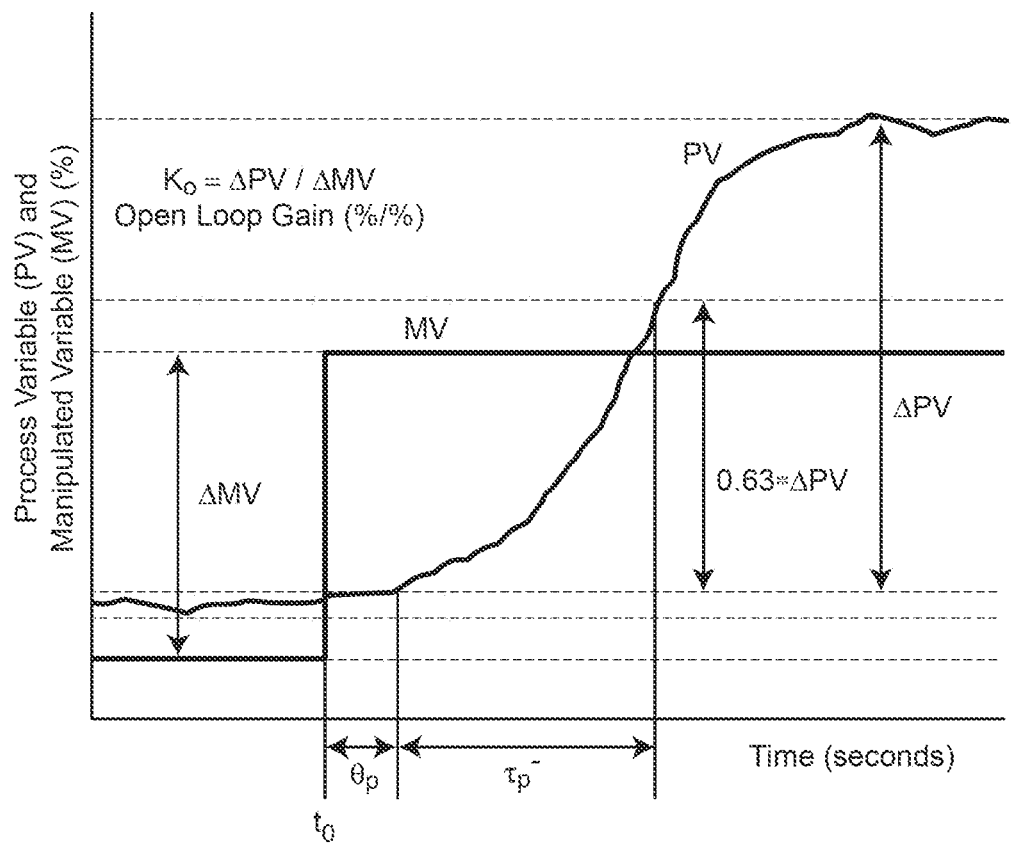
FIG. 3 is a graph depicting a typical response of a process variable to a change in a manipulated variable in a self-regulating process.

In a similar manner, FIG. 3 illustrates the open loop response of a self-regulating process. As will be seen in FIG. 3, after a change in the manipulated variable MV (indicated as occurring at a time $t_0$), the process variable PV stays roughly steady or constant through a deadtime period $\theta_p$ (i.e., the process variable PV does not under go any significant change) and thus remains within a noise band until the end of the deadtime period $\theta_p$. Thereafter, the process variable PV ramps up over a time, and after a significant period of time, begins to level out at a resting point or new steady state value. In this case, the process may be described or modeled by an open loop gain $K_o$ and a process time constant $\tau_p^-$. The open loop gain $K_o$ may be calculated as:

$$K_o = \Delta PV/\Delta MV$$

wherein:

$\Delta MV$ is the change in the manipulated variable; and $\Delta PV$ is the total change in the process variable between the initial value at time $t_0$ and the final resting value or the process variable.

Again this computation is typically performed using the changes in the process variable $\Delta PV$ and the manipulated variable $\Delta MV$ expressed as percentages of the ranges of these variables. In any event, as illustrated in FIG. 3, the dominant negative feedback process time constant $\tau_p^-$ is generally calculated as 0.63 times the total change in the value of the process variable PV (i.e., 0.63*$\Delta PV$).

Figure 4:
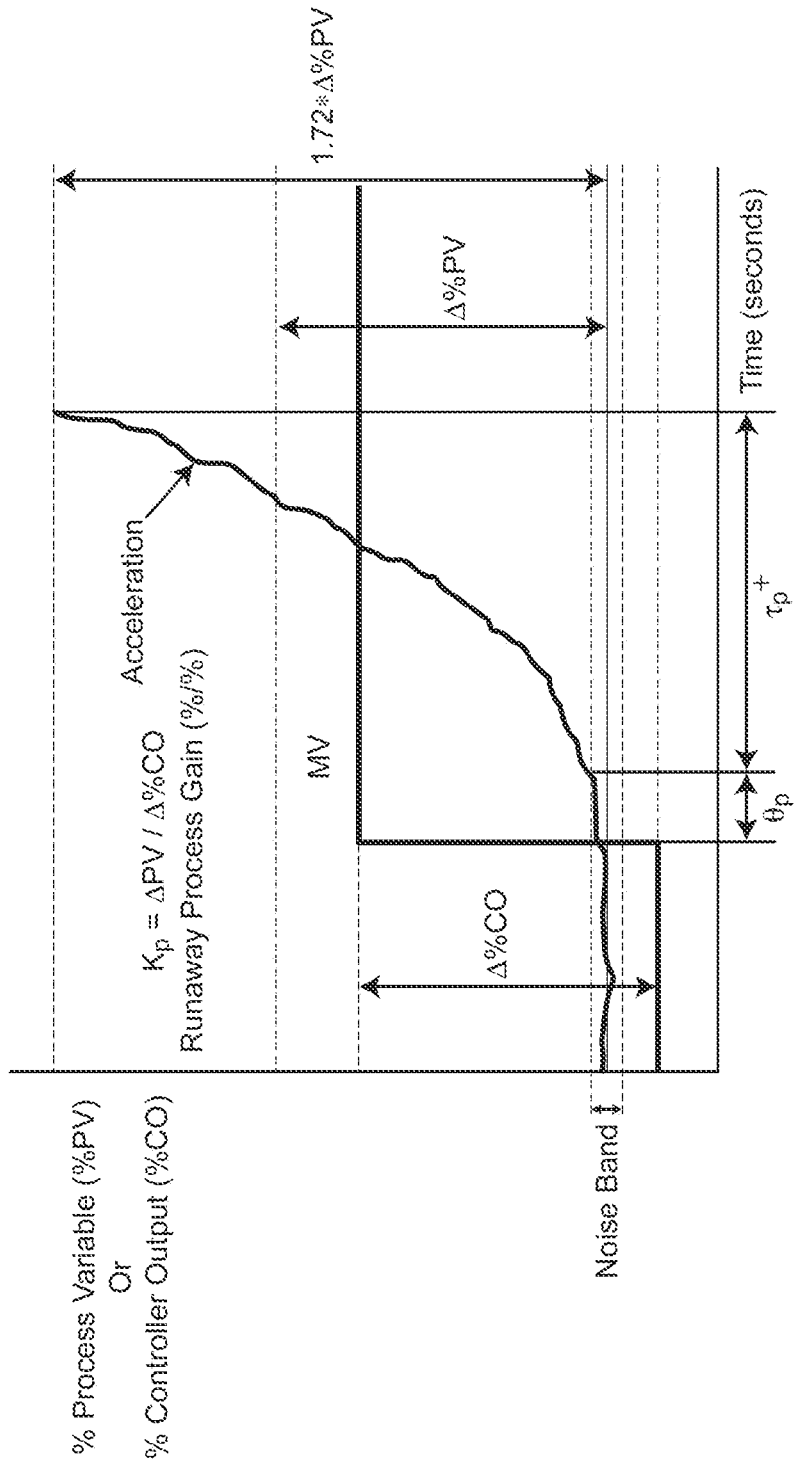
FIG. 4 is a graph depicting a typical response of a process variable to a change in a manipulated variable of a run-away process.

FIG. 4 illustrates a typical response of a run-away process seen most commonly in highly exothermic reactor temperature control situations. As illustrated in FIG. 4, in a run-away process, in response to a change in the manipulated variable MV, the process variable PV remains in the noise band until some time after the change in the manipulated variable MV, which time is defined as the process deadtime $\theta_p$. Thereafter, the process variable PV changes at a ramp rate that tends to increase over time due to positive feedback within the process. For example, in some exothermic processes, an increase in the reaction rate (which occurs with an increase in temperature) causes a greater heat release, which then further increases the temperature, resulting in a still greater reaction rate, and so on. Because of the acceleration in the temperature response from the positive feedback of the process, a point of "no return" is eventually reached where the control system cannot quench the reaction. In these cases, for example, a pressure being measured can quickly exceed the setting of the relief valves or can rupture discs within pressure valves in the system (e.g., in minutes), resulting in the reactor contents blowing over to a flare system. Consequently, it is important that the temperature controller react to the initial ramp rate before the acceleration from the positive feedback gets to the point of no return. This result can typically be achieved by using the highest possible controller gain during control.

In any event, a run-away process can be modeled with a process gain $K_p$ and a dominant positive feedback time constant $\tau_p^+$. Here, the process gain is calculated as:

$$K_p = \Delta \%PV / \Delta \%CO$$

wherein:

$\Delta \% PV$ is the change in the process variable (in percent) over a significant period of time; and $\Delta \% CO$ is the change in the controller output (i.e., the manipulated variable) in percent.

Additionally, the positive feedback time constant $\tau_p^+$ is typically set as the time it takes the process variable PV to reach 1.72 times the $\Delta \% PV$. Of course, in run-away processes, most of the characterizing tests are performed in closed loop control situations because of the unstable nature of the process.

As can be seen from the graphs of FIGS. 2-4, some non-integrating processes, such as fast acting processes with high process gains and slow processes with large dominant time constants, may be characterized as having integrating or "near integrating" responses in the control region immediately following the deadtime period $\theta_p$. In particular, as illustrated in FIG. 2, after a change in the manipulated variable MV and after the deadtime $\theta_p$, the ramp rate of the process variable PV of an integrating process changes immediately and tends to reach a tangent or fairly steady state ramp rate very quickly. As will be seen from FIGS. 3 and 4, this same phenomena actually occurs in both of the illustrated self-regulating and the run-away processes, at least for a short period of time immediately following the end of the deadtime period $\theta_p$. With respect to FIG. 3, it should be noted that the example process response is not associated with a particularly slow process because of the limited space to illustrate the entire self-regulating response in the graph of FIG. 3. However, most self-regulating processes of interest in the process industry have a time constant that is more than an order of magnitude larger than that shown in FIG. 3. In these cases, the bending of the initial response (due to a secondary time constant) to a new ramp rate as seen in FIG. 3 is less significant, and the process variable PV ramp rate is more representative of the tangent line to the inflection point.

While the classic integrating process is a pure batch or level process, less than ten percent of typical industrial chemical processes are integrating processes. Moreover, less than one percent of the typical industrial chemical processes are run-away processes, which are almost exclusively associated with highly exothermic reactors used in plastics and specialty chemical production processes. Thus, over 90 percent of industrial chemical processes are self-regulating processes. However, for the reason provided above, many continuous and fed-batch processes found in the chemical industry (or at least those with the greatest direct economic benefits) behave as and can be treated as being, for the modeling purposes described herein, "near integrating" processes. In particular, as used herein, a "near integrating" process is one that initially reacts like an integrating process, over at least two deadtimes after the expiration of the process deadtime period, in that the process variable tends to ramp at a fairly constant rate in response to a step change in the manipulated variable for a short period of time after the expiration of the process deadtime period.

As a result of the fact that most processes of interest in the process control industry are integrating processes or can be characterized as near-integrating processes, a method of rapidly identifying a process model for a process described below is able to operate on all of these types of processes. Generally speaking, the method of rapidly identifying a process model for a process as described herein determines a process deadtime $\theta_p$ and an integrating gain $K_i$ for the process based on the response of the process variable to a change in the manipulated variable in the short time period following the change in the manipulated variable. As indicated above, this technique can be applied to many different types of processes or process loops including integrating process loops and self-regulating or run-away process loops that can be characterized as "near integrating" process loops.

More particularly, a relatively accurate process model can be developed for a process by estimating or determining an integrating gain of the process based on the response of the process variable during a short period of time immediately following or shortly after the expiration of the process deadtime period. In fact, for integrating and near integrating processes, once the deadtime period of the process has expired, the process variable very quickly tends to change at a ramp rate that remains fairly constant throughout the entire process response time, especially during open loop control. This process variable ramp rate can thus be measured at a point early in the process response period, and this measured ramp rate can then be used to determine an integrating gain for the process which, in turn, can be used to estimate other characterizing parameters of the process (process model parameters), such as the process gain and the dominate time constant, without needing to wait until the entire response period of the process has occurred or until the process has been controlled to reach a steady state in response to the change in a manipulated variable. As a result, a process model can be rapidly determined or identified for even slowly responding processes, such as processes that take minutes, hours or even days to reach their final settling point, based on the response of the process variable during a relatively short period of time immediately following the change in the control or manipulated variable.

Of course, determining the process deadtime involves determining the time at which a change in a manipulated variable, such as a set point change or an output of the controller, is provided to the process, and measuring the controlled process variable (or other process variable of interest) to identify when the process variable begins to change in response to the manipulated variable change. The process deadtime is then determined as the time between the controller output (manipulated variable) change and the start of the process variable change. Of course, there are many known manners of estimating process deadtime, and any of these techniques can be used to determine the process deadtime in a process.

To determine or estimate the integrating gain $K_i$ of the process, the method identifies or measures the ramp rate of the process variable for a short period of time after the expiration of the deadtime period $\theta_p$, and uses the identified ramp rate to determine a ratio of a change in the process variable over time to the change in the manipulated variable. The short period of time after the expiration of the deadtime period $\theta_p$ during which the process variable ramp rate is determined may generally be within the initial portion of the process response time following the end of the deadtime period, such as prior to the halfway point of the process response time, within one or a few deadtimes after the end of the deadtime period, within ten deadtimes after the end of the deadtime period, etc. For example, the technique may determine the ramp rate of the process variable within a time period expanding two to six multiples of the identified process deadtime after the expiration of the process deadtime period. However, the process variable ramp rate may be determined over other desired periods of time immediately after or shortly following the expiration of the deadtime period, such as over a time period equal to two or more multiples of the identified deadtime. In one embodiment, the process variable ramp rate may be measured multiple times over a number of consecutive (e.g., six to ten) time periods following the expiration of the deadtime period, each time period being, for example, the length of the identified process deadtime. In this case, the method may then select the highest or steepest (i.e., maximum) ramp rate of those measured as the identified process variable ramp rate. In other embodiments, the selected or identified process variable ramp rate may be an average, median or other statistical measure of a plurality of measured ramp rates determined for different times during the process variable response immediately after or shortly after the end of the process deadtime period. Still further, a single process variable ramp rate may be measured or determined based on data extending over any desired period of time following the expiration of the deadtime period, such as a time period equal to two, three, or more deadtimes.

Once determined, the process variable ramp rates are used to determine the process integrating gain $K_i$. In particular, the process integrating gain $K_i$ may be determined as the ratio of the percent change in the process variable ramp rate over time (i.e., the process variable ramp rate expressed in percent change in the process variable over time) to the change in the manipulated variable (expressed in percent change in the manipulated variable). This relationship may be expressed mathematically as:

$$K_i = (\Delta PV_2/\Delta T_2 - \Delta PV_1/\Delta T_1)/\Delta MV$$

wherein:

$\Delta T_1$ and $\Delta T_2$ are time intervals determining the ramp rate;

$\Delta PV_1$ and $\Delta PV_2$ are the maximum changes in the measured process variable (in percent of process variable ran during the time intervals $\Delta T_1$ and $\Delta T_2$, respectively; and $\Delta MV$ is the change in the manipulated variable in percent of the manipulated variable range.

Here $\Delta T_1$ may be any time interval before the end of the deadtime period $\theta_p$ and $\Delta T_2$ may be any time interval after the end of the deadtime period $\theta_p$, but preferably is immediately after or shortly after the expiration of the deadtime period $\theta_p$. Moreover, $\Delta T_1$ and $\Delta T_2$ may be relatively short periods of time as compared to the process response time, such as one deadtime to six deadtimes.

Thereafter, the identified process deadtime $\theta_p$ and the integrating gain $K_i$ may be used to determine one or more process model parameters such as process gain, process dead time and a dominate time constant of the process, or may be used to determine factors, quantities or variables in a first principles model, such as in an ordinary differential equation (ODE) process model.

As will be understood, because the estimated process deadtime $\theta_p$ and the estimated integrating in $K_i$ can be determined in a relatively short period of time following the change in the manipulated variable (or disturbance variable), e.g., in two to ten deadtimes after the change in the manipulated variable, a process model for the process can be determined very quickly, and in fact can be determined in many cases before the controller has completed control of the process variable to reach steady state in response to the change in the manipulated variable.

Thus, the generalized methodology of rapidly identifying a process model includes identifying the process deadtime as the time before there is an appreciable response in the process variable and identifying the integrating process gain from a change in ramp rates from before and after the deadtime. The period of time to identify the change in ramp rate can be as short as, for example, two dead times and may extend up to any number of dead times but is always less than the total process response time. The calculation may continue to refine the determination of the integrating gain until the ramp rate decreases or begins to decrease. As will be understood, the computation of deadtime and integrating gain will generally start after a change in loop set point or after the final control element that triggers a quantifiable change in a disturbance variable, manipulated variable, or process input that affects a measurable process variable. These process outputs can be, for example, PID process variables, MPC controlled variables or any process, economic, or quality variable. The integrator gain $K_i$ can then be used to provide experimental and/or hybrid experimental ODE models or other models for plant simulations.

Moreover, it is estimated that the time to automatically identify and deploy process models using this technique can be reduced to a matter of minutes, enabling the development of a plant wide simulation in a very short period of time. The integrating gain $K_i$ can also be used to parameterize ODE models based on material and energy balances by using the integrating gain $K_i$ directly for integrating or to compute the process time constant as the ratio of a process gain to a near integrating gain for self-regulating and non-self-regulating positive feedback processes.

More particularly, for both self-regulating and run-away processes, a process gain $K_p$ can be calculated or approximated as:

$$K_p = PV_o/MV_o$$

wherein $PV_o$ and $MV_o$ are the initial values of the process variable and the manipulated variable immediately prior to or at the change in the manipulated variable. Of course, if desired, other manners of estimating the process gain may be used instead.

Still further, a negative feedback process time constant $\tau_p^-$ for a self-regulating or a positive feedback process time constant $\tau_p^+$ for a run-away process can be calculated as:

$$\tau_p^- = K_p/K_i$$

$$\tau_p^+ = K_p/K_i$$

Thus, in this case, the process gain $K_p$ is estimated as the ratio of the initial process variable to initial manipulated variable just before the change in the manipulated variable. It is important that the experimental and hybrid models use deviations of the manipulated variable as inputs and provide deviations of process variables as outputs to deal with operating point nonlinearities that are prevalent in the process industry.

Figure 5:
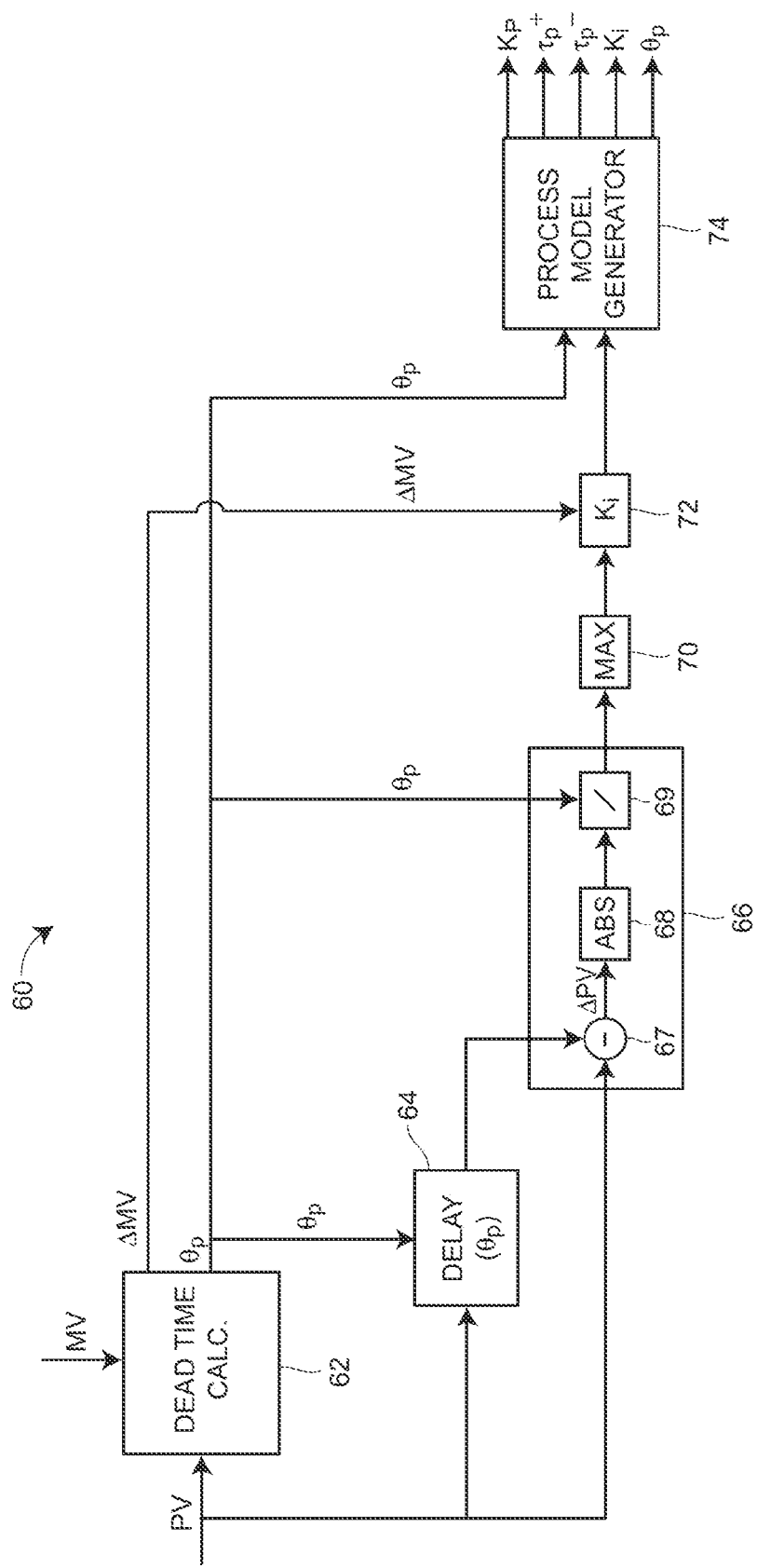
FIG. 5 is a function block diagram of one of the rapid process model identification and generation modules of FIG. 1.

FIG. 5 illustrates a simplified function block diagram 60 that can be used to implement one or more of the model identification modules 50 of FIG. 1 to determine a process variable deadtime, ramp rate, integrating gain and other process model parameters for a particular pair of process and manipulated variables PV and MV during, for example, online or ongoing operation of the plant or the process within the plant. Of course, the process variable PV could be a measured value of the process variable being controlled by the manipulated variable MV or could be any other process variable that is affected by the manipulated variable MV and for which a relationship or model with the manipulated variable MV is desired. Moreover, the manipulated variable MV could be a controller output, a set point, a disturbance variable or any other variable that affects the process variable directly or indirectly.

As illustrated in FIG. 5, the process variable PV and the manipulated variable MV of interest are provided to a deadtime block 62, which detects changes in the manipulated variable MV. The deadtime block 62 records the manipulated variable change and produces a signal ΔMV indicating the change in the manipulated variable. The deadtime block 62 also records the process variable value after detecting a change in the manipulated variable MV, and monitors the process variable value over time to detect or determine the process deadtime $\theta_p$ associated with this particular pair of a process variable and a manipulated variable. When the process variable PV begins to change significantly (outside of a noise band) after the change in the manipulated variable MV, the deadtime block 62 determines or calculates the process deadtime $\theta_p$ as the amount of time it took the process variable PV to respond to or to begin to change in response to the change in the manipulated variable MV. Of course, there are many different manners or techniques that may be used to determine a process deadtime $\theta_p$ based on a measurement of a process variable and a manipulated variable, and any of these techniques can be used in the block 62.

An output of the block 62 representative of the identified process deadtime $\theta_p$ is provided to a delay block 64 and to a ramp detection circuit or block 66. The delay block 64 receives the current measurement of the process variable PV and delays this measurement by a time equal to the determined process deadtime $\theta_p$. The ramp detection block 66 includes a summer 67 that determines a difference between the delayed value of the process variable PV and the current value of the process variable PV to detect the change in the process variable ΔPV over one deadtime period $\theta_p$. The ramp detection block 66 may also include an absolute value block 68 that determines the absolute value of the output of the summer 67 and may further include a divider circuit 69 that divides the output of the block 68 by the deadtime $\theta_p$ to produce a ramp rate as the value of the change in the process variable ΔPV over a single deadtime period $\theta_p$. If desired, the value of the change in the process variable ΔPV may be expressed as or converted to a percent change in the range of the process variable PV prior to being delivered to the divider block 69.

The process variable ramp rate is then provided to a maximum detection circuit or block 70 that may store or analyze the output of the ramp rate detection block 66 after each calculation to determine the maximum ramp rate value over a certain period of time, such as, for example, over two to ten deadtime periods. If desired, the ramp rate block 66 may determine a ramp rate multiple times every deadtime period and output this ramp rate to the maximum detection block 70 after each calculation. The maximum detection block 70 can then determine the maximum one of the ramp rates produced by the ramp rate block 66. Alternatively, the delay block 64 and the ramp rate block 66 may operate on a continuous basis so as to determine a ramp rate continuously or near continuously over a certain predetermined time after the end of the deadtime period during the process variable response, or until the ramp rate begins to decline. In this case, the maximum detection block 70 detects a maximum ramp rate output by the bock 66 during this continuous or near continuous period of time. The maximum detection block 70 could be replaced with a block that determines some other statistical measure or value associated with the various ramp rates determined by the block 66, such as an average ramp rate, median ramp rate, etc.

In any event, the blocks 64, 66 and 70 as described herein operate together to calculate or to determine the maximum or other statistical ramp rate found over a set of time periods each equal in length to one deadtime period (or to multiple deadtime periods if so desired), to thereby determine the maximum ramp rate associated with the process variable immediately or shortly after the end of the process variable deadtime period (e.g., within a time equal to two to ten deadtimes after the end of the deadtime period). The identified deadtime can be used to immediately update the delay block 64 so that the change in the process variable is computed during the deadtime and after the deadtime. Here, it is preferable to use the maximum detected change in the ramp rate. The use of the deadtime for the time intervals $\Delta T_1$ and $\Delta T_2$ enables the method to be applicable to the identification of the process gain and controller gain for processes including but not limited to self-regulating, integrating, and runaway processes. In particular, the use of the deadtime for the time intervals $\Delta T_1$ and $\Delta T_2$ extends the methodology to processes where the deadtime is larger than the process time constant as described above. The delay block includes but is not limited to the type of deadtime block in the DeltaV product, where a change in deadtime does not bump the block output. Of course, it will be understood that the delay block 64 could instead delay the process variable PV by more than a single deadtime, such as a multiple of the detected deadtime, e.g., two, three, etc. deadtimes. In this case, the divider block 69 would divide the detected change in the process variable ΔPV by the same period of time as used in the delay block 64.

As will be understood from FIG. 5, the maximum detection block 70 outputs a detected maximum ramp rate to the an integrating gain determination block 72 which uses the detected maximum ramp rate value and the change in the manipulated variable ΔMV (which may be expressed as or converted to a percentage change in the manipulated variable value range) to calculate the integrating gain $K_i$ as described above. The determination block 72 then provides the calculated integrating gain value $K_i$ to a process model generator 74, which also receives the detected process deadtime $\theta_p$ from the deadtime block 62. The process model generator 74 uses these values in the manner described above to determine one or more additional process model parameters such as a process gain $K_p$ for a self-regulating or a run-away process, a negative or a positive process feedback time constant $\tau_p^-$, $\tau_p^+$ for a self-regulating or a run-away process, etc. Additionally, or alternatively, if desired, the process model generator block 74 may use the integrating gain $K_i$ and/or the process deadtime $\theta_p$ to develop variable values used in one or more ordinary differential equation models. The process model generation block 74 may output any or all of these process model parameters or values, including the integrating gain $K_i$ and the deadtime $\theta_p$ and may provide these values as process models to a tuner unit or a control routine (such as one of the control routines 42, 44, 46 of FIG. 1), an auto-tuning routine, a simulation routine (such as the simulation routine 52 of FIG. 1), or any other control module which uses process models to perform some activity within the process plant.

While the block 70 is described herein as detecting the maximum ramp rate output by the block 66, the block 70 could instead determine and use any other desired statistical value of the ramp rates output by the block 66, including an average ramp rate, a median ramp rate, a minimum ramp rate, etc. The use of the maximum ramp rate is preferable however, as it provides for the most conservative (i.e., largest) integrating gain $K_i$, which provides the safest or fastest controller response when used for control purposes. This condition may be necessary in, for example, run-away processes where it is critical for the controller to prevent the process from reaching a point of no return.

The use of the identified deadtime in a delay block to compute the maximum change in the process variable that is based on a change in the manipulated variable both during the process deadtime and after the process deadtime also enables the rapid modeling method described herein to be used for processes where the deadtime is larger than the process time constant, i.e., in deadtime dominant processes. The resulting universal equation for the controller gain can be shown to result in the controller gain for a deadtime dominant process as follows:

$$K_i = \frac{(\Delta PV_{max}/\Delta t)}{\Delta CO_{max}} \quad \text{(Identification of integrator gain)} \quad (1)$$

Here
$K_i$=Integrating gain;
$\Delta PV_{max}$=Maximum observed change in the process variable;
$\Delta CO_{max}$=Change in the controller output (e.g., the manipulated variable); and
$\Delta t$=change in time over which $\Delta PV_{max}$ is measured.

It is also well known that controller gain $K_c$ for a PID controller can be computed as:

$$K_c = K_x * \frac{1}{K_i * \theta_o} \quad (2)$$

(PID gain for maximum disturbance rejection $\lambda = \theta_o$)

Substituting equation (1) into equation (2) gives:

$$K_c = K_x * \frac{\Delta CO_{max}}{(\Delta PV_{max}/\Delta t) * \theta_o} \quad (3)$$

If the time interval is equal to the observed process deadtime ($\Delta t = \theta_o$) and the $\Delta PV_{max}$ and $\Delta CO_{max}$ are created by passing the process variable and control output through a dead time block with the dead time parameter set equal to the observed process deadtime $\theta_o$, then the integrating process gain $K_i$ is simply $$K_c = K_x * \frac{\Delta CO_{max}}{\Delta PV_{max}} \quad \text{(equation 3 with } \Delta t = \theta_o\text{)} \quad (4)$$

The tuning factor $K_x$ for maximum disturbance rejection may be set to, for example, 0.4 for self-regulating, 0.5 for integrating, and 0.6 for runaway processes, which corresponds to a Lambda equal to the observed deadtime ($\lambda = \theta_o$). For situations where the update interval is much larger than the process time to steady state, the factor $K_x$ may be set to 1.0. Of course, the factor $K_x$ could be computed in other manners as well.

In one case, the check for the maximum change in process variable could begin one process deadtime after the change in controller output (manipulated variable) rises above a trigger level and could continue for, for example, four or more deadtime intervals. The process deadtime is identified as the time interval from the start of a change in the controller output (manipulated variable) to an observed change in the process variable beyond the noise band. The noise band can be pre-set or can be automatically identified. The test works for a change in the controller output in manual or for a set point change if the controller gain is high.

To insure a fast update and minimal reaction to noise, it is desirable that deadtime blocks used in this scheme are used to create a continuous or near continuous train of delayed process variables and delayed controller output variables for computing the change in these variables over the deadtime interval. In this case, the delay block may produce a series of delayed process variable values that are separated in time by less than the observed deadtime (e.g., 10 or 100 measurements per deadtime period) and the summer can determine a difference in the process variable for each delayed process variable value (and the then current value of the process variable value) to thereby produce a series of process variable difference values. In this manner, the process variable ramp value is measured many times during any particular time period having a length equal to the deadtime period. Using this technique, as will be understood, this method is applicable to and can be used to rapidly determine process models for deadtime dominant loops, where the controller gain is simply the factored inverse of the open loop process gain.

In any event, the PID controller gain $K_c$ for a deadtime dominant loop can be determined as:

$$K_c = K_x * \frac{1}{K_p} \quad (5)$$

Figure 6:
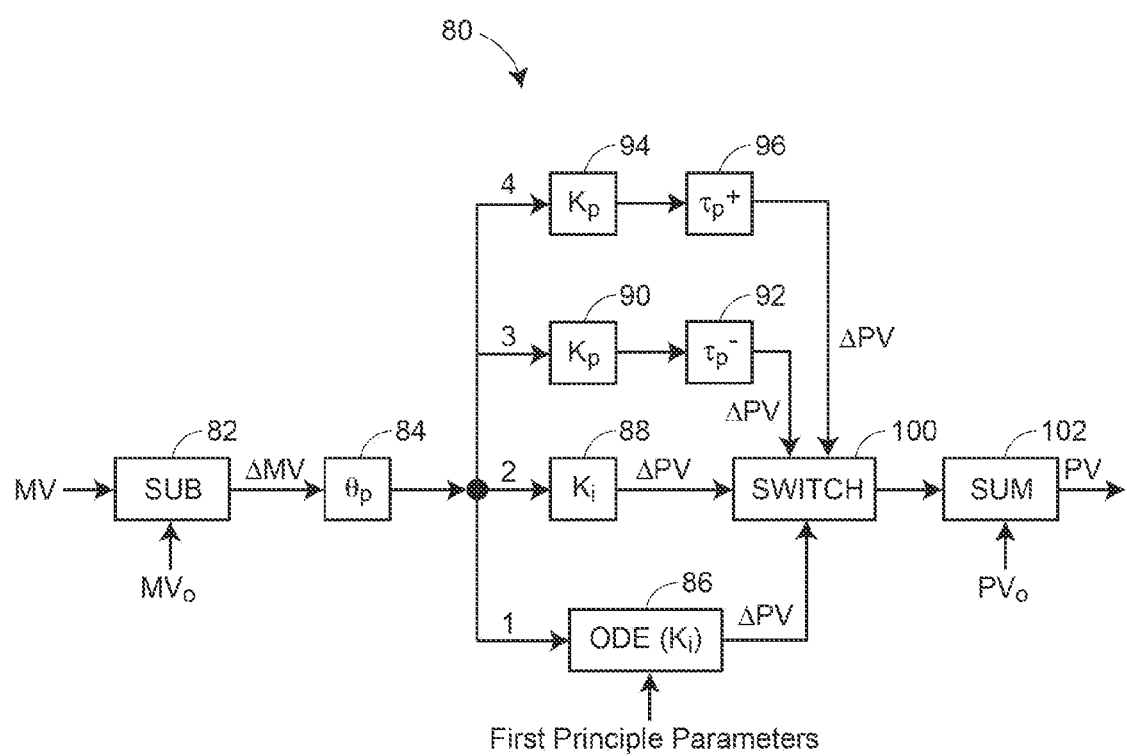
FIG. 6 is a schematic representation of a simulation system that may be used to simulate the operation of a process loop or a process using process models created by one of the rapid model identification and generation modules of FIG. 1 or 5.

FIG. 6 illustrates a simulation system 80 that implements process simulation using a number of different process models as determined by, for example, one or more of the model identification and generation modules 50. In particular, for an integrating process, the simulation system 80 may use the integrating gain $K_i$ and process deadtime $\theta_p$ to perform a simulation routine. However, for different types of processes, such as self-regulating processes and run-away process, the simulation system 80 may use a process gain $K_p$ and a dominant time constant $\tau_p^-$ or $\tau_p^+$ calculated from the integrating gain $K_i$ to perform process modeling and simulation. Still further, the simulation system 80 may use the integrating gain $K_i$ and/or the process deadtime $\theta_p$ to develop variables in an ordinary differential equation model.

More particularly, the simulation system 80 illustrated in FIG. 6 performs simulation using any or all of a number of different process models, which can be used to model different types of processes. In particular, the simulation system 80 includes a summing block 82, which subtracts the initial value of the manipulated variable $MV_o$ from the current value of the manipulated variable MV to produce a change in the manipulated variable $\Delta MV$. The change in the manipulated variable $\Delta MV$ is then provided through a delay circuit or a delay block 84, which delays the change in the manipulated variable value $\Delta MV$ by the deadtime $\theta_p$. The delayed change in the manipulated variable value $\Delta MV$ is then provided to each of four different model streams or branches, each of which uses a different type of process model to predict or simulate the reaction of the process variable PV to the change in the manipulated variable value $\Delta MV$.

In a first model branch, a block 86 implements a first principles model in the form of, for example, an ordinary differential equation (ODE) model. The ODE model uses the integrating gain $K_i$ and possibly the deadtime $\theta_p$ to estimate one or more of the first principle parameters used in the ordinary differential equations of the model and solves the ordinary differential equations of the model to produce, at the output of the block 86, an estimated change in the process variable $\Delta PV$ based on the delayed change in the manipulated variable $\Delta MV$.

In a second modeling branch, typically associated with or used to simulate an integrating process, the delayed change in the manipulated variable $\Delta MV$ is provided to an integrator block 88, which integrates this signal using the integrating gain $K_i$ to produce an estimated change in process variable value $\Delta PV$. The output of the integrator block 88 will of course vary over time as the integration continues.

In a third modeling stream, typically associated with a sell-regulating process, the delayed change in the manipulated variable $\Delta MV$ is provided to a multiplication or gain block 90, which multiplies the delayed change in the manipulated variable $\Delta MV$ by the process gain $K_p$. The output of the gain block 90 is provided to a filter 92 which may be in the form of a decay circuit, which uses the negative process feedback time constant $\tau_p^-$ to estimate the value of the change in process variable $\Delta PV$ over time.

In a fourth modeling stream, typically associated with a run-away process, the delayed change in the manipulated variable $\Delta MV$ is provided to a multiplication or gain block 94, which multiplies the delayed change in the manipulated variable $\Delta MV$ by the process gain $K_p$. The output of the block 94 is provided to a positive feedback circuit 96, which may be, for example, an exponential increase circuit or block, and which uses the positive feedback process time constant $\tau_p^+$ to estimate the change in the process variable $\Delta PV$ over time.

As illustrated in FIG. 6, the estimated changes in the process variables $\Delta PV$ from each of the four modeling branches are provided to a switch 100, which may be operated by a user or by software to select which of the four modeling techniques or process models to use in the simulation to actually estimate the output of the process variable PV in any particular case. The estimated change in the process variable $\Delta PV$ as determined by the one of the four modeling streams is passed by the switch 100 to a summing circuit or block 102 where this estimated change in the process variable $\Delta PV$ is summed with the initial value of the process variable $PV_o$ (i.e., the value of the process variable PV at the time that the manipulated variable MV changes), to produce the estimate of the process variable PV. Of course, the final estimated process variable PV will be dependent on the time at which the change in the process variable $\Delta PV$ is estimated.

In any event, each of the four modeling streams can produce an estimate of the process variable PV response at each of a different set of times or in a continuous manner over a time horizon, to thereby produce an estimate of the entire response of the process variable PV to a change in the manipulated variable MV. Thus, the entire response of the process variable PV can be estimated or simulated over a control horizon in order to simulate or estimate the response of the process variable PV to the change in the manipulated variable MV. This feature thereby allows a user to alter or change the control response or control action to provide for a better or a more desirable control response. For example, the user may use the simulation to produce new controller parameters, such as controller tuning parameters, to retune the controller to result in a better control response based on the process model simulation. Interestingly, because the process models used in the simulation system 80 are developed very quickly after a change in the manipulated variable, these models enable the process to which these models pertain to be simulated prior to the controller being able to complete a control response to the change in the manipulated variable that resulted in the development of the process models (e.g., before the controller controls the process to return to steady state in response to the change in the manipulated variable or before the end of the process response time). As a result, these models enable a controller to be tuned to provide a better controller reaction to the very change in the manipulated variable that resulted in the generation of the process models in the first place.

Of course, the simulation system 80 of FIG. 6 is merely one example of a simulation technique that can be used within the simulation block 52 of FIG. 1. In fact, many other types of simulation routines could be used instead, so long as these techniques use the integrating gain $K_i$ and/or the process deadtime $\theta_p$ calculated as a result of, or based on, the initial reaction of the process variable to a change in a manipulated variable. Moreover, while the simulation system 80 of FIG. 6 is described herein as using any or all of a set of four different simulation techniques to simulate the response of a process variable PV to a change a manipulated variable MV based on process models developed from an integrating gain $K_i$ and a process deadtime $\theta_p$, a simulation system could use a single one of these modeling techniques, or could implement any other type of simulation technique that uses any of the process model parameters developed by, for example, the system 60 of FIG. 5, and need not estimate a response of the process variable PV using a multiplicity of different types of process models or even the particular ones described herein.

Still further, if desired, a user may select or determine which of the modeling branches to use in a particular simulation (i.e., how to set the switch 100) based on factors such as the type of process that is being controlled, which may be known by the user. On the other hand, a user may run a simulation of the response of a process variable to a change in the manipulated variable using each of the different modeling branches, and may compare the simulation of each branch to actually measured or collected data (stored in the data historian 12 of FIG. 1, for example) to determine which modeling branch best describes or models this particular process or process loop. In one embodiment, a user may run the modeling techniques of each of the branches in the system 80 on a set of previously collected or stored process variable and manipulated variable data and may compare the estimated process variable response to the actually measured process variable response to determine which modeling branch provides the best simulation, and thus which branch best characterizes the process or the relationship between the process variable and the manipulated variable. In this manner, the model identification and simulation techniques described herein can be used on previously stored data (indicative of the measured response of a process variable to a manipulated variable) to determine the best or most accurate type of modeling technique to use in the future for that process loop.

While the rapid process model identification and generation system 50 has been described herein as providing one or more process models to the simulation system 52, which in turn has been described being used to simulate a process loop, the process models developed by the blocks 50 could instead or additionally be provided to other types of systems, such as to controllers (for performing model based control, such as MPC or even PID control), to auto-tuners (for tuning controllers), etc. Still further, the simulation system 52 described herein may be used to quickly simulate a process loop response, and the output of this simulation system may be used to retune a controller that is controlling the process loop to obtain a better or more desirable control response to the very change in the manipulated variable from which the process model was developed. Moreover, the methodology described herein extends beyond relationships between process variables and manipulated variables of process loops, but is applicable to any measurable variable and any changeable manipulated variable MV that has an effect on the variable. Moreover, this technique is applicable for rapidly developing process models used for processes that are have a true integrating response or slow processes with a "near integrating" response (e.g., $\tau_p > 2\theta_p$). Still further, the calculated process deadtime $\theta_p$ and the calculated integrating process gain $K_i$ can be used for controller tuning and for plant-wide simulations, including but not limited to being used to develop models such as hybrid ordinary differential equation (ODE) and experimental models, integrating process experimental models, slow self-regulating experimental models and slow non-self-regulating positive feedback (run-away) experimental models.

Any of the above-described applications or blocks may be implemented as routines, modules or other components of one or more integrated applications. The disclosed arrangement of application functionality is provided merely for ease in illustration and is not indicative of the broad range of manners in which the functionality may be implemented on a computer or provided to an operator or other user. Moreover, when implemented, any of the software modules or routines described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. Furthermore, this software may be provided directly without modulation or encryption or may be modulated and/or encrypted using any suitable modulation carrier wave and/or encryption technique before being transmitted over a communication channel.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A method of generating a process model for a process, comprising:
    collecting process data related to a process variable and a manipulated variable within the process;
    determining a ramp rate associated with the process variable after a change in the manipulated variable from the collected process data generated within a particular time period, wherein the particular time period is at least partially after the end of a deadtime period associated with the process;
    generating a process model for the process using the determined ramp rate; and
    using the generated process model to determine a parameter for controlling the process prior to the process being controlled to reach steady state in response to the change in the manipulated variable.

2. The method of claim 1, further including estimating a process deadtime associated with the process from the collected process data, and wherein generating the process model using the determined ramp rate includes using the determined process deadtime and the determined ramp rate to generate the process model.

3. The method of claim 1, wherein determining a ramp rate associated with the process variable includes determining a change in the process variable over the particular time period, wherein the length of the particular time period is related to an estimated process deadtime for the process.

4. The method of claim 3, wherein the length of the particular time period is equal to the estimated process deadtime.

5. The method of claim 3, wherein the length of the particular time period is a multiple of the estimated process deadtime.

6. The method of claim 3, wherein the particular time period occurs within a time frame that starts at the end of the deadtime period and that extends a length of time equal to or less than ten times the process deadtime after the end of the deadtime period.

7. The method of claim 1, wherein generating the process model for the process using the determined ramp rate includes determining an integrating gain for the process from the determined ramp rate.

8. The method of claim 7, wherein determining an integrating gain for the process includes determining a ratio of the determined ramp rate to the change in the manipulated variable.

9. The method of claim 7, further including using the integrating gain for the process to determine process model parameters for the process.

10. The method of claim 9, further including using the process model parameters to simulate the operation of the process prior to the process being controlled to reach steady state in response to the change in the manipulated variable.

11. The method of claim 9, further including using the process model parameters to determine control parameters for controlling the process and using the control parameters to control the process prior to the process being controlled to reach steady state in response to the change in the manipulated variable.

12. The method of claim 1, wherein determining the ramp rate associated with the process variable after a change in the manipulated variable includes determining a change in the process variable over the particular time period.

13. The method of claim 12, further including estimating the process deadtime from the collected process data and wherein the particular time period is equal to or is a multiple of the estimated process deadtime.

14. The method of claim 1, wherein determining the ramp rate associated with the process variable after a change in the manipulated variable includes determining multiple values of a process variable ramp rate over different time periods of equal length and determining the ramp rate as a statistical measure of the multiple values of the process variable ramp rate.

15. The method of claim 14, wherein the statistical measure of the multiple values of the process variable ramp rate is a maximum of the multiple values of the process variable ramp rate.

16. The method of claim 14, wherein the statistical measure of the multiple values of the process variable ramp rate is an average of the multiple values of the process variable ramp rate.

17. A method of simulating the operation of a process, comprising:

collecting process data related to a process variable and a manipulated variable within the process;

determining a ramp rate associated with the process variable after a change in the manipulated variable from the collected process data;

generating a process model for the process using the determined ramp rate; and simulating the operation of the process using the process model prior to the process being controlled to reach steady state in response to the change in the manipulated variable.

18. The method of claim 17, further including using the simulation to determine a new set of control parameters for a process controller that controls the process prior to the process being controlled to reach steady state in response to the change in the manipulated variable.

19. The method of claim 18, further including providing the new set of control parameters to the process controller that controls the process prior to the process being controlled to reach steady state in response to the change in the manipulated variable and using the new set of control parameters in the process controller to control the process to reach steady state in response to the change in the manipulated variable.

20. The method of claim 17, further including estimating the process deadtime associated with the process from the collected process data, and wherein generating the process model using the determined ramp rate includes using the determined process deadtime and the determined ramp rate to generate the process model.

21. The method of claim 17, wherein determining a ramp rate associated with the process variable includes determining a change in the process variable over a particular time period, wherein the length of the particular time period is related to the process deadtime.

22. The method of claim 21, wherein the length of the particular time period is equal to the process deadtime.

23. The method of claim 17, wherein generating the process model for the process using the determined ramp rate includes determining an integrating gain for the process from the determined ramp rate.

24. The method of claim 23, wherein determining an integrating gain for the process includes determining a ratio of the determined ramp rate to the change in the manipulated variable.

25. The method of claim 17, wherein determining the ramp rate associated with the process variable after a change in the manipulated variable includes determining multiple values of a process variable ramp rate over different time periods of equal length and determining the ramp rate as a statistical measure of the multiple values of the process variable ramp rate.

26. A method of controlling a process being controlled by a process controller using a set of control parameters, comprising:

collecting process data related to a process variable and a manipulated variable within the process;

determining a ramp rate associated with the process variable after a change in the manipulated variable from the collected process data before the process is controlled to reach steady state in response to the change in the manipulated variable;

generating a process model for the process using the determined ramp rate;

using the process model to determine a new set of control parameters for the process controller prior to the process being controlled to reach steady state in response to the change in the manipulated variable; and providing the new set of control parameters to the process controller prior to the process being controlled to reach steady state in response to the change in the manipulated variable.

27. The method of claim 26, further including using the new set of control parameters in the process controller to control the process to reach steady state in response to the change in the manipulated variable.

28. The method of claim 26, further including estimating the process deadtime associated with the process from the collected process data, and wherein generating the process model using the determined ramp rate includes using the determined process deadtime and the determined ramp rate to generate the process model.

29. The method of claim 26, wherein determining a ramp rate associated with the process variable includes determining a change in the process variable over a particular time period, wherein the length of the particular time period is related to the process deadtime.

30. The method of claim 29, wherein the length of the particular time period is equal to the process deadtime or is a multiple of the process deadtime.

31. The method of claim 26, wherein generating the process model for the process using the determined ramp rate includes determining an integrating gain for the process from the determined ramp rate.

32. The method of claim 26, wherein determining the ramp rate associated with the process variable after a change in the manipulated variable includes determining multiple values of a process variable ramp rate over different time periods of equal length and determining the ramp rate as a statistical measure of the multiple values of the process variable ramp rate.

33. A process model generation system, comprising:

a processor;

a first routine stored on a computer readable medium that operates on the processor to collect process data related to a process variable and a manipulated variable within an on-line process;

a second routine stored on the computer readable medium that operates on the processor to determine a ramp rate associated with the process variable after a change in the manipulated variable over a time period that occurs within a time frame ending prior to the process variable reaching a resting value in response to the change in the manipulated variable; and a third routine stored on the computer readable medium that generates a process model for the process using the determined ramp rate and, prior to the process variable reaching the resting value in response to the change in the manipulated variable, determines a parameter based on the process model for at least one of: (i) controlling the process, or (ii) simulating the process.

34. The process model generation system of claim 33, further including a fourth routine stored on the computer readable memory that operates on the processor to estimate a process deadtime associated with the process from the collected process data, and wherein the second routine uses the estimated process deadtime to determine the ramp rate.

35. The process model generation system of claim 34, wherein the time period is equal to the estimated process deadtime.

36. The process model generation system of claim 34, wherein the time period is equal to a multiple of the estimated process deadtime.

37. The process model generation system of claim 34, wherein the third routine generates the process model for the process using the determined ramp rate by determining an integrating gain for the process from the determined ramp rate.

38. The process model generation system of claim 34, wherein the second routine determines the ramp rate associated with the process variable after a change in the manipulated variable by determining multiple values of a process variable ramp rate over different time periods of equal length and determines the ramp rate as a statistical measure of the multiple values of the process variable ramp rate.

39. A process modeling system for use with a process, comprising:
   a data collection device that collects process data related to a process variable and a manipulated variable within the process;
   a deadtime device that determines, from the collected process data, a deadtime associated with the process;
   a ramp device that determines a ramp rate associated with the process variable after a change in the manipulated variable from the collected process data generated within a particular time period related to the determined deadtime, wherein the particular time period occurs within a time frame that ends prior to the process being controlled to reach steady state in response to the change in the manipulated variable;
   a modeling device that generates, prior to the process being controlled to reach steady state in response to the change in the manipulated variable, a process model for the process using the determined ramp rate; and
   a tuning device that determines, prior to the process being controlled to reach steady state in response to the change in the manipulated variable, one or more control parameters from the process model for use in controlling the process.

40. The process modeling system of claim 39, wherein the particular time period is equal to the determined deadtime.

41. The process modeling system of claim 39, wherein the particular time period is a multiple of the determined deadtime.

42. The process modeling system of claim 39, wherein the ramp device includes a delay block that delays the collected process variable by the particular time, a summer that determines a difference signal indicative of the difference between the current process variable value and the process variable value delayed by the delay unit and a divider unit that divides the difference signal by the particular time to produce the process variable ramp rate.

43. The process modeling system of claim 42, further including a simulation device that uses the process model parameters to simulate the operation of the process prior to the process being controlled to reach steady state in response to the change in the manipulated variable.

44. The process modeling system of claim 42, wherein the ramp device further determines a series of process variable ramp rates after a change in the manipulated variable, and further includes a statistical block that determines a statistical measure of the series of process variable ramp rates to produce the process variable ramp rate.

45. The process modeling system of claim 44, wherein the statistical block determines a maximum of the series of process variable ramp rates as the process variable ramp rate.

46. The process modeling system of claim 44, wherein the modeling device determines the process model for the process by determining an integrating gain for the process from the determined process variable ramp rate.

47. The process modeling system of claim 46, wherein the modeling device determines the integrating gain for the process by determining a ratio of the determined process variable ramp rate to the change in the manipulated variable.

48. The process modeling system of claim 39, further including a controller that controls the process and wherein the tuning unit provides the control parameters to the controller prior to the controller controlling the process to reach steady state in response to the change in the manipulated variable.

49. A method of generating a process model for a process, comprising:
   collecting process data related to a process variable and a manipulated variable within the process;
   determining a ramp rate associated with the process variable after a change in the manipulated variable from the collected process data generated within a particular time period, wherein the particular time period is at least partially after the end of a deadtime period associated with the process and the length of the particular time period is equal to or less than ten times the process deadtime; and
   generating, prior to the end of the particular time period, a process model for the process using the determined ramp rate.

50. The method of claim 49, wherein the length of the particular time period is greater than or equal to the length of the process deadtime.

51. The method of claim 49, wherein the length of the particular time period is greater than or equal to two times the process deadtime.

52. The method of claim 49, wherein the particular time period includes multiple non-consecutive time-periods.

53. The method of claim 49, wherein the process is a process other than a non-integrating process.

54. The method of claim 49, wherein determining the ramp rate associated with the process variable after a change in the manipulated variable includes determining multiple values of a process variable ramp rate over different time periods of equal length and determining the ramp rate as a statistical measure of the multiple values of the process variable ramp rate.

55. The method of claim 49, wherein the length of the particular time period is less than or equal to six times the process deadtime.

56. The method of claim 55, wherein the length of the particular time period is greater than or equal to the length of the process deadtime.

57. The method of claim 55, wherein the length of the particular time period is greater than or equal to two times the process deadtime.

* * * * *